US009479514B2

(12) United States Patent
Tan et al.

(10) Patent No.: US 9,479,514 B2
(45) Date of Patent: Oct. 25, 2016

(54) METHOD AND SYSTEM FOR CONTROLLING ACCESS TO WIRELESS APPARATUSES

(71) Applicant: CERTIS CISCO SECURITY PTE LTD, Singapore (SG)

(72) Inventors: Poh Beng Tan, Singapore (SG); Martin James Baptist, Singapore (SG); Keen Hon Wong, Singapore (SG); Honching Lui, Singapore (SG); Xiang Li, Singapore (SG)

(73) Assignee: Certis Cisco Security PTE LTD., Singapore (SG)

( * ) Notice: Subject to any disclaimer, the term of this patent is extended or adjusted under 35 U.S.C. 154(b) by 0 days.

(21) Appl. No.: 14/901,666

(22) PCT Filed: Mar. 18, 2014

(86) PCT No.: PCT/SG2014/000134
§ 371 (c)(1),
(2) Date: Dec. 28, 2015

(87) PCT Pub. No.: WO2015/057161
PCT Pub. Date: Apr. 23, 2015

(65) Prior Publication Data
US 2016/0156636 A1    Jun. 2, 2016

(30) Foreign Application Priority Data
Oct. 16, 2013  (SG) .............................. 201307689-8

(51) Int. Cl.
*H04L 29/06*       (2006.01)
*H04W 12/06*     (2009.01)
(Continued)

(52) U.S. Cl.
CPC ............. *H04L 63/105* (2013.01); *F41A 17/06* (2013.01); *G06F 21/42* (2013.01); *H04L 9/085* (2013.01);
(Continued)

(58) Field of Classification Search
CPC ................ H04W 12/06; H04W 4/008; H04L 2463/082; H04L 63/0838; H04L 63/0853; H04L 63/0492
See application file for complete search history.

(56) References Cited

U.S. PATENT DOCUMENTS 8,438,631 B1 * 5/2013 Taylor ................. G06F 21/6236
726/15
2002/0141586 A1 * 10/2002 Margalit ................. H04L 63/06
380/270

(Continued)

FOREIGN PATENT DOCUMENTS

SG           158780 A1      2/2010
WO    WO 2013/191648 A1   12/2013

OTHER PUBLICATIONS

Dellutri F, Me G, Strangio MA. Local authentication with bluetooth enabled mobile devices. InJoint International Conference on Autonomic and Autonomous Systems and International Conference on Networking and Services-(icas-isns' 05) Oct. 23, 2003 (pp. 72-72). IEEE.*
Bojinov H, Boneh D. Mobile token-based authentication on a budget. InProceedings of the 12th Workshop on Mobile Computing Systems and Applications Mar. 1, 2011 (pp. 14-19). ACM.*

*Primary Examiner* — James Turchen
(74) *Attorney, Agent, or Firm* — Blank Rome LLP

(57) ABSTRACT

A system for securely controlling access between two wireless (i.e. Bluetooth-enabled) apparatuses, also comprising a supervisor apparatus. The first apparatus is paired to the second by establishing a secure wireless (i.e. Bluetooth) link. The first apparatus includes a stored partial link key and a link key generator: The first apparatus receives a first secret key from the apparatus user, and may also receive a second secret key from the supervisor apparatus. The link key generator generates either a first link key based upon a stored first partial link key, the first secret key and the second secret key or a second link key based upon the stored first partial link key and the first secret key. An access control module in the second apparatus determines the level of access that the first apparatus is granted based upon the link key used to establish the secure connection—full/restricted access.

41 Claims, 3 Drawing Sheets

(51) Int. Cl.
*H04W 4/00* (2009.01)
*F41A 17/06* (2006.01)
*H04W 12/08* (2009.01)
*H04W 12/04* (2009.01)
*G06F 21/42* (2013.01)
*H04L 9/08* (2006.01)

(52) U.S. Cl.
CPC ............. *H04L 9/0838* (2013.01); *H04L 63/06* (2013.01); *H04L 63/0838* (2013.01); *H04L 63/0853* (2013.01); *H04W 4/008* (2013.01); *H04W 12/04* (2013.01); *H04W 12/06* (2013.01); *H04W 12/08* (2013.01); *H04L 63/0492* (2013.01); *H04L 2209/80* (2013.01); *H04L 2463/082* (2013.01)

(56) References Cited

U.S. PATENT DOCUMENTS

| | | | |
|---|---|---|---|
| 2006/0135065 A1* | 6/2006 | Lee | H04W 12/04 455/41.1 |
| 2013/0227677 A1* | 8/2013 | Pal | G06F 21/33 726/19 |
| 2013/0242706 A1* | 9/2013 | Newsome, Jr. | H04L 9/0844 367/197 |
| 2013/0297933 A1* | 11/2013 | Fiducia | H04L 63/0853 713/156 |
| 2014/0068744 A1* | 3/2014 | Bran | G06F 21/445 726/9 |
| 2014/0273845 A1* | 9/2014 | Russell | H04W 76/023 455/41.2 |
| 2015/0067793 A1* | 3/2015 | Robison, Jr. | H04L 63/0838 726/5 |

\* cited by examiner

METHOD AND SYSTEM FOR CONTROLLING ACCESS TO WIRELESS APPARATUSES

RELATED APPLICATIONS

This application is a national phase of PCT/SG2014/000134, filed on Mar. 18, 2014, which claims the benefit of Singapore Application No. 201307689-8, filed on Oct. 16, 2013, the entire contents of which are incorporated herein by reference.

INCORPORATION BY REFERENCE

The present application refers to the following documents:
Singaporean Patent Number 2008057382
The entire content of this document is hereby incorporated by reference.

TECHNICAL FIELD

The present invention relates to wireless apparatuses and in one particular form relates to methods for controlling access to a wireless apparatus.

BACKGROUND

The Specification of the Bluetooth System (hereafter referred to as the Bluetooth specification) defines a short range wireless communication system. The system uses frequency hopping spread spectrum technology in the unlicensed Industrial, Scientific, and Medical (ISM) 2.4 GHz short-range radio frequency band. Bluetooth is primarily designed for low power short range communications, typically using low-cost transceiver microchips embedded in devices. Devices may be assigned a class based upon the maximum permitted power, which defines an effective transmission range. Class 1 devices have a range of approximately 1 m, class 2 devices have a range of approximately 10 m, and class 3 devices have a range of approximately 100 m. As Bluetooth is a radio frequency based system, communications between devices need not be line of sight. Version 1.2 of the specification provides for data rates of 1 MBit/s and version 2.0+EDR provides for a data rate of 3 MBit/s. Version 2.1 of the specification was adopted on Jul. 26, 2007 and includes Simple Secure Pairing to increase security during pairing. Version 3.0+HS was adopted on Apr. 21, 2009 and includes high speed data transfers of up to 24 Mbit/s through use of a Bluetooth negotiated IEEE 802.11 link. Version 4.0 was adopted on Jun. 3, 2010, and includes support for Bluetooth low energy (BLE, previously known as Wibree). Devices which implement the Bluetooth specification will be referred to as Bluetooth enabled devices.

Bluetooth devices are assigned a unique Bluetooth Device Address (BD_ADDR) which is a 48 bit address assigned from the IEEE Registration Authority. The address is comprised of three fields—the lower address part consisting of 24 bits (LAP), the upper address part consisting of 8 bits (UAP), and the non-significant address part consisting of 16 bits (NAP). The LAP is company assigned, and the UAP and NAP form a company ID. There are 64 contiguous LAP values reserved for inquiry operations.

All Bluetooth transmissions over the physical channel begin with an access code based upon the LAP of a device address or an inquiry address. The device access code (DAC) is used during paging. Only the Bluetooth device address is required to set up a connection. To establish new connections a paging procedure is used in which a device makes a page scan using the Bluetooth device address of the target. The Bluetooth device address may be obtained from user interactions, or via an Inquiry procedure, in which a device asks for the Bluetooth device addresses of all nearby devices (additional information is also provided). Individual devices can choose whether or not to respond to Inquiry requests.

To enable the establishment of a secure connection between two Bluetooth devices, the Bluetooth specification defines Security Mode 3 which is a link level security mode. A bond is created between the devices by creating, exchanging and storing a common link key (K) which is associated with the Bluetooth Device Address of the other device and such devices are said to be bonded or paired. The common link key is used in authentication procedures during the establishment of a secure connection between the two devices, and is also used to generate an encryption key for encrypting data sent over the connection.

The Bluetooth specification defines a pairing procedure (LMP-Pairing, also known as simple pairing) which may be performed for the purpose of generating and storing the link key for later use (this is known as bonding), or as part of the procedure for establishing a secure connection between two devices. The pairing procedure involves creating an initialisation key $K_{init}$ in both devices, using this to create a combined link key $K_{AB}$, and then mutually authenticating the generated combined link key before allowing establishment of a secure connection.

Generation of initialisation is performed by the first device (A) sending a 128 bit random number (IN_RAND) to the second device (B). Each device then creates an initialisation key $K_{init}$ using the Bluetooth Device Address of the first device (BD_ADDR$_A$), the random number generated by the first device (IN_RAND) and a (typically 4 digit) PIN code known to both devices. After the generation of the initialisation key, a combined link key ($K_{AB}$) is generated. Both devices choose a 128 bit random number (LK_RAND$_A$, LK_RAND$_B$) which is bitwise xor'ed with the initialisation key $K_{init}$ and then sent to the other device. Each device then extracts the other device's random number and a common link key is created based on (LK_RAND$_A$, LK_RAND$_B$, BD_ADDR$_A$, BD_ADDR$_B$). Finally, a mutual authentication step is performed.

In a mutual authentication step, a first device chooses a 128 bit random number (AU_RAND$_A$) as a challenge and sends it to the second device. The second device creates a 32 bit word SRES'$_A$ using (AU_RAND$_A$, BD_ADDR$_B$, $K_{AB}$) which is sent back to A. A makes its own calculation of SRES$_A$ using the same input, and compares the two numbers. If SRES$_A$ and SRES'$_A$ agree, the process is repeated but with the roles of A and B switched (i.e. B initiates and A responds). This mutual authentication procedure is also used by two paired devices when they are establishing any future secure connections (in which case a link key already exists and does not have to be regenerated).

A problem with the pairing procedure is that if a third party eavesdrops on the whole pairing procedure, they can perform brute force calculations through the space of all available PINs and obtain the link key. For example a four digit pin can be cracked in 63 milliseconds using a 3 GHz Pentium IV processor. Version 2.1 of the Specification defines Secure Simple Pairing to provide passive eavesdropping protection through the use of public key cryptography system. Devices exchange public keys, and use one of 4 protocols to exchange information which is used to generate a shared key. A link key is then calculated from the derived shared key and publicly exchanged data. This makes the task of obtaining the link key a considerably more difficult problem than previously, but in most cases it is still susceptible to a "Man in the Middle" attack.

Whether pairing is performed according to the more secure Version 2.1 specification, or earlier less secure versions, a problem exists that either device can control when a new link key is generated. In some situations in which devices are issued to users, it may be desirable that pairing of devices is performed in a controlled or supervised situation, and that further unauthorised (re)pairing is prevented. The present applicant has addressed the issue of establishing a secure Bluetooth connection in Singaporean Patent Number 2008057382, the entire content of which is hereby incorporated by reference.

Whilst this approach provides secure bonding between the two devices, and prevents tampering of the link, this does not provide secure access control to the devices, or even guarantee that the devices are issued to appropriate personnel, for example if the user and issuer collude, or if a user inappropriately obtains the secret key allowing him to self-issue a pair of devices. Other more general wireless communication arrangements and protocols may also suffer from this disadvantage. There is thus a need to provide secure access control systems between two apparatus.

SUMMARY

According to a first aspect, there is provided a method for securely controlling access in an apparatus, the method comprising:

storing a partial link key in a first apparatus;

receiving, by the first apparatus, a first secret key from a first source;

generating a link key for establishing a secure connection with a second apparatus, wherein if the first apparatus receives a second secret key from a second source then the link key has a first link key value generated using the stored partial link key, the first secret key and the second secret key, else if no second secret key is received from a second source then the link key has a second link key value generated using the stored partial link key and the first secret key;

storing the generated link in the first apparatus;

establishing a secure wireless connection between the first apparatus and a second apparatus using the link key;

granting, to the first apparatus by the second apparatus, a first level of access to the second apparatus if the link key has the first link key value, and granting a second level of access if the link key has the second link key value, the second level of access having less access than the first level of access.

According to a second aspect, there is provided an apparatus, comprising:

a memory, the memory comprising a first partial link key;

a user input module for receiving a first secret key from a user;

a first communications module for receiving a second secret key; and a link key generator for generating a first link key based upon the stored first partial link key, the first secret key and the second secret key or a second link key based upon the stored first partial link key and the first secret key;

a secure wireless communications module for establishing a secure wireless connection with a second enabled apparatus using either the first link key or the second link key.

According to a third aspect, there is provided an apparatus, comprising:

a memory, the memory comprising a first link key and a second link key;

a wireless communications module for establishing a secure wireless connection with a second apparatus using either the first link key or the second link key;

an access control module for granting access to the one or more functions or resources of the apparatus to the second apparatus, wherein the access control module grants a first level of access to the second apparatus if the secure wireless connection was established with first link key value, and grants a second level of access if the secure wireless connection was established with second link key value, the second level of access having less access than the first level of access.

According to a fourth aspect, there is provided a supervisor apparatus, comprising:

a memory, the memory for storing a secret key;

a communications module for establishing a communication link with first apparatus, and providing the secret key to the apparatus for use in generating a link key for generating a secure connection with a second first apparatus.

According to a fifth aspect, there is provided a system comprising:

a first apparatus according to the second aspect;

a second apparatus according to the third aspect; and a supervisor apparatus according to the fourth aspect.

According to further aspects, the apparatus may comprise a processor and a memory comprising instructions for performing the method of the first aspect, and a processor readable medium may also be provided comprising processor readable instructions for performing the method of the first aspect.

BRIEF DESCRIPTION OF DRAWINGS

Embodiments will be discussed with reference to the accompanying drawings wherein.

In the following description, like reference characters designate like or corresponding parts throughout the figures.

DESCRIPTION OF EMBODIMENTS

Figure 1:
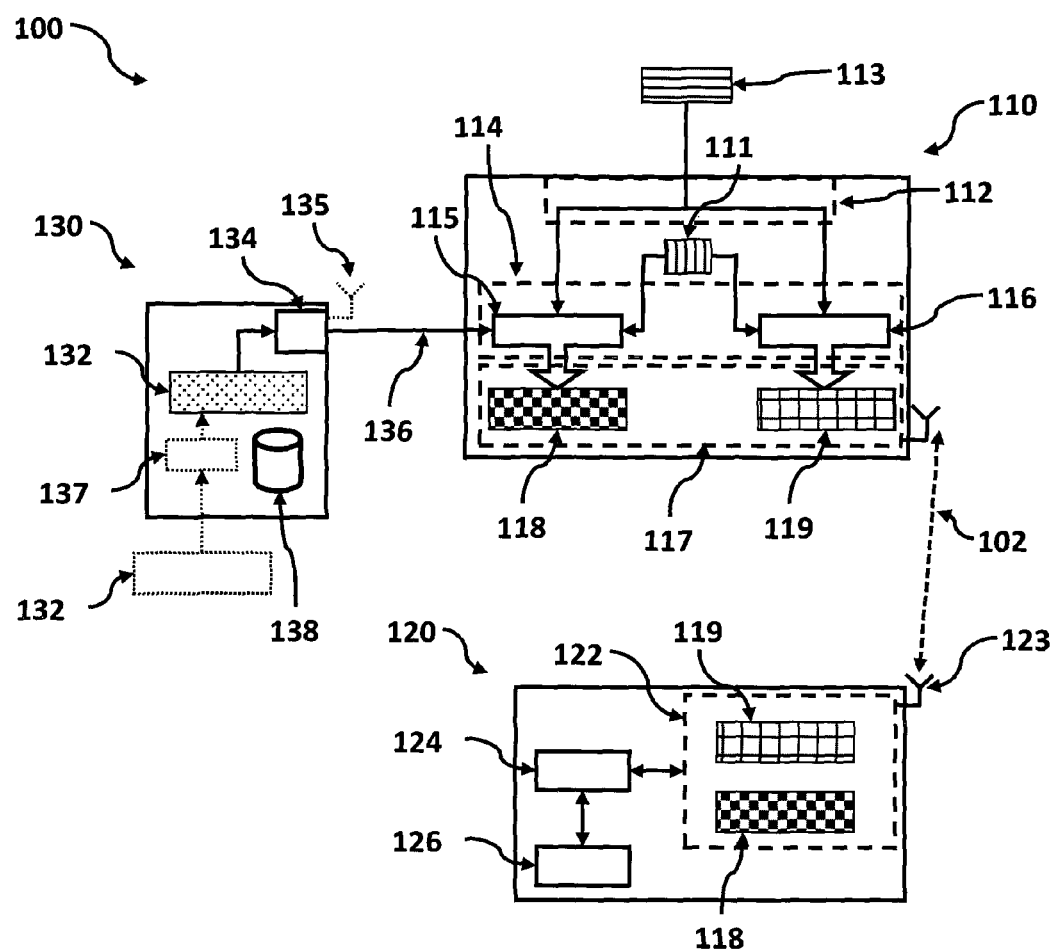
FIG. 1 is a block diagram of a system for providing access control to an apparatus according to an embodiment.
Figure 2:
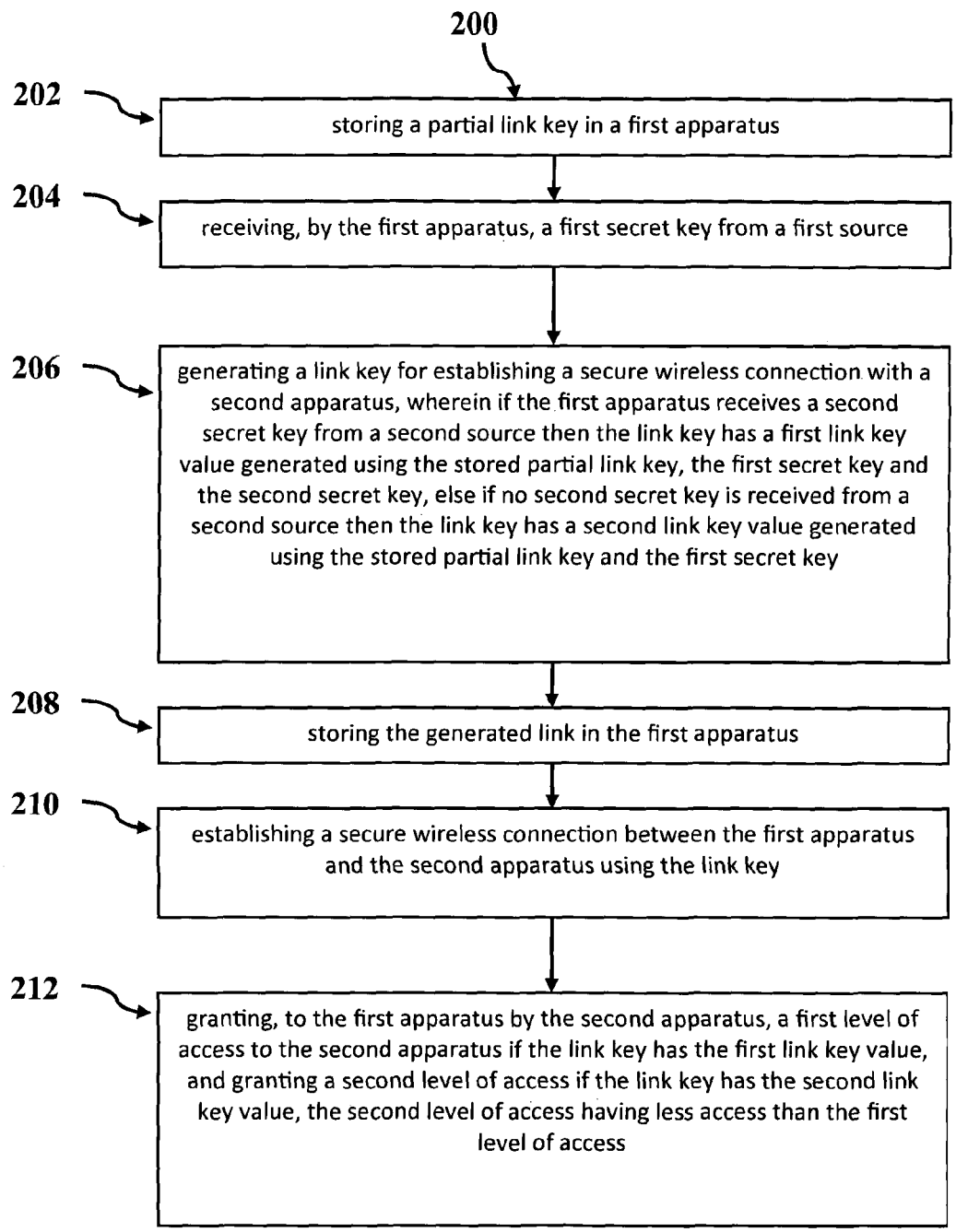
FIG. 2 is a flow chart of a method for securely controlling access in an apparatus according to an embodiment.

Referring now to FIG. 1, there is shown a system 100 for securely controlling access in an apparatus according to an embodiment. FIG. 2 shows a flow chart of a method 200 for securely controlling access in an apparatus implemented in the system 100 shown in FIG. 1. The terms apparatus will be used interchangeably with device, and the described functionality may be provided in a single housing or as a single component, or it can be comprised of multiple components which may be distributed provided they are functionally connected, such as by cables, wires, or wireless links.

The system 100 comprises a first apparatus 110, a second apparatus 120 and a supervisor apparatus 130. The first apparatus is paired to the second apparatus by establishing a secure wireless communications link 102. Once the secure wireless connection is established the first apparatus attempts to access functions and resources 126 provided by the second apparatus 120. An access control module 124 determines the level of access that the first apparatus is granted based upon the link key used to establish the secure wireless connection 102. If the link key is not recognised (i.e. does not match a stored link key) no secure wireless connection link is established, and no access is granted.

To further illustrate the method, an embodiment will now be described in which the first and second apparatus are each Bluetooth enabled apparatus. However it is to be understood that this is to assist in understanding the invention and the invention is not limited to Bluetooth enabled apparatuses/devices, but is applicable to other communication systems/protocols which enabled establishment of a secure communication link on the basis of a commonly known or shared link key. In this embodiment, the second Bluetooth enabled apparatus 120 includes a Bluetooth communications module 122 with antenna 123 that includes a modified implementation of the Bluetooth Specification which disables use of the standard bonding procedure used to generate a link key. The link key is as 128 bit number as defined in the Bluetooth Specification (i.e. 128 bit random number), and is suitable for performing authentication and generation of encryption keys for supporting establishment of secure paired connections between two Bluetooth enabled apparatus using Bluetooth protocols. Instead of generating a link key during establishment of the secure Bluetooth connection, and risking possible eavesdropping or other spoofing attacks, the apparatus 120 stores a plurality of link keys in a memory used for establishing a secure Bluetooth connection 102 with another Bluetooth enabled apparatus. An access control level or set of access rights is stored or associated with each link key. The access control level may be used to control access to functions or resources of the second Bluetooth enabled apparatus. Other data can also be associated with the link key (for example the Bluetooth address of device for pairing with, an expiry date, etc.).

In this embodiment the second Bluetooth enabled apparatus stores two link keys—a first link key 118 with an unrestricted access level (i.e. full access), and a second link key 119 with a restricted access level. In other embodiments more than 2 link keys could be stored to provide a range of access levels (and thus functionality). The link keys are stored in a memory or storage component which may be RAM, ROM, a memory card, firmware chip, or other suitable means for storing information. The apparatus may further include a microprocessor or microcontroller for controlling operation of the apparatus (not shown).

In order to establish the secure Bluetooth communications link, the first Bluetooth enabled apparatus must generate one of the link keys stored by the second Bluetooth enabled apparatus. The first Bluetooth enabled apparatus 110 includes a partial link key (PLK) 111 which is stored in a memory or storage component included in the apparatus. Such a component may include a RAM, ROM, a memory card, firmware chip, or other suitable means for storing information. The apparatus may further include a microprocessor or microcontroller for controlling operation of the apparatus (not shown).

The first Bluetooth enabled apparatus 110 further includes a user input module 112, which may be an input apparatus such as a keypad (which may be numeric, alphanumeric, symbolic, etc.), a keyboard, a biometric scanner, or a near field reader (e.g. for a secure ID token). The input apparatus may be integrated into the apparatus, connected using a wired connection (e.g. USB or other cable), or over a wireless connection such as a Bluetooth, Wi-Fi, mobile telecommunications link or other radio frequency or IR link. Security of the system is enhanced if the input apparatus is integrated or connected over a wired connection to reduce the risk of eavesdropping or spoofing. Many Bluetooth enabled apparatuses such as mobile computing apparatuses (e.g. tablets, laptops, mobile phones, trunked radio handsets etc.) include a user input apparatus, a microprocessor and a memory and these in built features can be configured for use with the methods described herein. The user input module 112 is used to receive a first secret key 113 from a user. This may be a password, numeric code, a cryptographic hash, etc. The first Bluetooth enabled apparatus may have its only functionality and may also comprise a communications module and user interface for communicating over a mobile phone or long range radio communications protocol.

The first Bluetooth enabled apparatus also includes a link key generator for generating a link key 114. The link key generator may comprise hardware, software or a combination thereof and may be implemented within one or more general purpose processors, microprocessors, application specific integrated circuits (ASICs), programmable logic devices (PLDs), field programmable gate arrays (FPGAs), or other electronic units designed to perform the function of generating a link key, which may be generated using known cryptographic methods that use two input numbers, such as the E2 or E3 key generation functions used in the Bluetooth specification.

The link key generator is configured to receive the partial link key 111 stored in the apparatus and the first secret key 112 from the user. Additionally the link key generator is configured to receive a second secret key 132 from a supervisor apparatus 130 over a communications link 136 (the second secret key will also be referred to as a supervisory key). The communications link may be a wired or wireless link. In the case of a wireless link it may be a near field or short range communications link such a Bluetooth link. The communications link may be a secure communications link. The first Bluetooth enabled apparatus comprises a communications module for communicating with the supervisor apparatus 130 over the communications link 136.

The link key generator 114 is configured to generate either a first link key 118 based upon the stored first partial link key 111, the first secret key 113 and the second secret key 132 or a second link key 119 based upon the stored first partial link key 111 and the first secret key 113 if the second secret key is unavailable (for example out of communications range with the supervisor apparatus). A Bluetooth communications module 117, implementing a modified version of the Bluetooth specification; uses the link key generated to establish a secure Bluetooth connection with the second enabled apparatus 120. The first Bluetooth enabled apparatus may be configured to only temporarily store the first and/or second secret key long enough to allow generation of a link key. If neither of the first secret key 113 or second secret key 132 is provided to the first Bluetooth enabled apparatus, then no link key can be generated and no secure communications link can be established with the second Bluetooth enabled apparatus.

In the above embodiment the first and second apparatus are each Bluetooth enabled apparatus. However it is to be understood that the method described is not limited to Bluetooth enabled apparatuses/devices, but is applicable to other communication systems/protocols where establishment of a secure communication link is performed on the basis of a commonly known (or shared) link key, one of which is generated based upon a partial link key stored in the apparatus and the other is stored in the second apparatus. In some embodiments these other communication protocols are also short range communications protocol (i.e. <100 m and in one embodiment <10 m) as this then requires close proximity between the first and second apparatus to be maintained. The apparatus may associate the link keys with specific device addresses, e.g. the Bluetooth device address, or a media access controller (MAC) address for the wireless communications module of an apparatus. That is link keys may be specific to specific apparatus.

The supervisor apparatus 130 comprises a memory for storing the second secret key 132 and a communications module 134 for transmitting or sending the second secret key 132 to the first Bluetooth enabled apparatus. As the second secret key effectively controls the level of access the user of the first apparatus will gain to the second apparatus, the second secret key is effectively a supervisory key. The communications module 134 may implement wired and/or wireless communications protocols, e.g. using an antenna 135. Wireless communications protocols may be near field (<1 m) or short range communications protocols (i.e. <100 m or <10 m). The second secret key 132 may be stored in the memory, or it may be provided by a user (e.g. a supervisor) using a user interface 137.

The supervisor apparatus may be a portable apparatus under the control of a supervisor. The supervisor may supervise or authorise issuing of the first and second apparatus to a user (e.g. a security or police officer) and may provide the second secret key to the first apparatus as part of the issuing and configuration process. In this way the user will only gain full access to the functionality of the second apparatus if the first and second apparatus were officially issued, preventing misuse or unauthorised use of the apparatus. The second secret key may be stored whilst the supervisor is logged into the supervisor apparatus, or the supervisor may be required to enter the second secret key, each time to send to a first apparatus, in which case it is only temporarily stored in memory.

In another embodiment, the supervisor apparatus is mounted or located in a fixed location. This can be used to provide proximity based access control. For example the supervisor apparatus could store the second secret key 132 in a memory, and wireless transmit the secret key to all devices/apparatus or selected devices within a first communications range using a near field or short range communications protocol (e.g. Bluetooth). In this embodiment the first apparatus may be configured to only maintain communications with the second apparatus 120 over the communications link 102 established using the first link key 118 generated using the second secret key, whilst the first apparatus 110 is within the communications range of the supervisor apparatus 130. That is, first level of access is granted only whilst the first apparatus remains within the first communication range of the supervisor apparatus. Once the first apparatus is no longer with the first communication range of the supervisor apparatus, the apparatus is configured to tear down the communications link 102 established with the first link key 118 and to then re-establish the communications link using the second link key 119 that grants restricted access.

FIG. 2 presents a flow chart of a method 200 for securely controlling access in an apparatus according to an embodiment. The method comprises the steps of:

storing 202 a partial link key in a first apparatus;
receiving, 204 by the first apparatus, a first secret key from a first source;

generating 206 a link key for establishing a secure wireless connection with a second apparatus, wherein if the first apparatus receives a second secret key from a second source then the link key has a first link key value generated using the stored partial link key, the first secret key and the second secret key, else if no second secret key is received from a second source then the link key has a second link key value generated using the stored partial link key and the first secret key;

storing 208 the generated link in the first apparatus;
establishing 210 a secure wireless connection between the first apparatus and the second apparatus using the link key;

granting 212, to the first apparatus by the second apparatus, a first level of access to the second apparatus if the link key has the first link key value, and granting a second level of access if the link key has the second link key value, the second level of access having less access than the first level of access.

In one embodiment the first source is a user of the first and second apparatuses, and the second source is supervisor apparatus. This may be an apparatus under the control of the supervisor of the user, and receives the second secret key (or supervisor key) from the supervisor, and it may be portable. That is the first secret key may be entered into the first apparatus by the user of the first apparatus, and the second secret key is not entered into the first apparatus by the user.

Alternatively the supervisor apparatus may be in a fixed location and may wirelessly transmit the second secret key from the supervisor apparatus to the first apparatus using a near field or short range wireless communications protocol if the first apparatus is within a first communication range of the supervisor apparatus. Further the first level of access is granted only whilst the first apparatus remains within the first communication range of the supervisor apparatus. When the first apparatus is no longer within a first communication range of the supervisor apparatus, the secure wireless connection between the first apparatus and the second apparatus using the first link key is torn down and a new secure wireless connection is established using the second link key. The second secret key may be transmitted over a secure wireless link.

In one embodiment or application, the system and method described herein can be used in a security or policing environment where a user is issued with equipment such as a mobile communications device (e.g. a radio or a mobile phone) and a controlled device such as a weapon (e.g. pistol, Taser, baton, etc.) and a holster. The method and system can be used to ensure that full use of the controlled device is only available to a user who is free to move around an operational area when it has been issued by a supervisor. Similarly, through the use of a fixed supervisor apparatus, proximity control can be provided so that full use may only be provided whilst the user is within a first communications range of the fixed supervisor apparatus.

For example in one embodiment the first apparatus is a mobile phone issued to a user, and the second apparatus is a weapon issued to the user. In this embodiment the ability to fire the weapon is access controlled based on the link key. That is, firing of the weapon is restricted/prevented unless both apparatus were issued to the user (e.g. a security officer) by a supervisor, who also provided the second secret key to the first apparatus (the mobile phone) when issuing so that a secure communications link could be established using the first link key (full access link key). If the user has not been authorised by the supervisor (i.e. no second secret key was provided to the first apparatus) then the user will not be able to fire the weapon. Proximity based control could also be used in this case, for example where a security guard is assigned to guard a specific building. In this case a supervisor apparatus can be co-located in/at the building so that the security guard is only authorised to use a weapon whilst they remain in close proximity to the building. If they move out of the first communications range, then functionality of the weapon is denied.

In another embodiment the second apparatus may be a secure communication device (e.g. a police radio). This could be permanently issued to a police officer. At the start of a shift, a supervisor could provide the second secret key to the first apparatus issued to the police officer, which could be a mobile phone, a GPS unit, a weapon or ID token, and a secure Bluetooth communications link could be formed between the two apparatuses. In this case the police officer will be allowed full access to the police radio such as the ability to send and receive transmissions. However when the shift ends, or when off-duty, the police officer may be provided with restricted access, such as being prevented from transmitting (i.e. can listen only), or only being permitted to make an emergency call. In the event that another person (i.e. not the police officer) obtains the police radio and the first communications apparatus, that other person will not be able to use the police radio at all (i.e. it can be prevented from transmitting or receiving), as that other person will not know the first secret key of the police officer that the radio was issued to, and thus will be unable to establish any secure communications link with the police radio (the second apparatus).

In another embodiment, the supervisor apparatus is a remote server. The remote server stores one or more second secret keys (which in the following embodiments we will refer to as supervisory keys) that are transmitted to the first apparatus for example via a private or public telecommunication network (for example, via data over GPRS, 3G, LTE or via SMS) or a long range communications link. In one embodiment, the supervisory key is sent over a secure link. The remote server may be a centralised management server that centrally stores a plurality of secret keys for a plurality of apparatuses. That is the remote server may supervise many apparatuses and thus many users. A decision on whether to send a secret key to a specific apparatus could then be based on additional information, such as shift rosters, etc. to ensure that the higher access is only provided during appropriate times (e.g. when the user is on a shift).

In one embodiment, after sending the supervisory key to a first apparatus of a wireless communications link, the supervisor apparatus maintains and monitors the communication link. The first apparatus can be configured such that if the communications link is lost, then the secure connection established using a link key generated from the supervisory key is torn down or the access level is revoked. In another embodiment the first apparatus is required to periodically check in with the supervisor apparatus, and if no connection is established then the secure connection established using a link key generated from the supervisory key is torn down or the access level is revoked.

In another embodiment, the a second server key may be associated with a specific geographical area, and the system configured so the link based upon the second server key is only maintained whilst the first apparatus is within the specific geographic area (the approved area).

The supervisor apparatus may include a location verification module 302 that is configured to monitor the location of the first apparatus. If the first apparatus is detected leaving the approved area associated with use of the supervisor key, a command is sent to the first apparatus that will lead to revocation of the current access level. This can be achieved by the first apparatus tearing down the secure wireless connection established using the first link generated using the supervisory (a new connection can be immediately established using a different link key). Alternatively the second apparatus could be informed that the current access level is to be revoked. The location of the first apparatus may be determined based a location service module 304 which estimates the location of the first apparatus in a private or public mobile network (e.g. the cell ID or using other information independent of the first apparatus), or the first apparatus may include a location estimator module 306 that provides a location estimate to the supervisor apparatus. Note that in this context, the terms location and position are considered to be equivalent (i.e. a location estimate is equivalent to a position estimate). The location estimation module 306 may be a Global Positioning System (GPS) receiver or other receiver for a wireless based global or regional positioning system (e.g. GPS, GLONASS, QZSS, IRNSS etc.) including satellite based and satellite based augmentation systems (e.g. WASS, EGNOS. etc.) or similar systems utilising transmitters with known locations.

Figure 3:
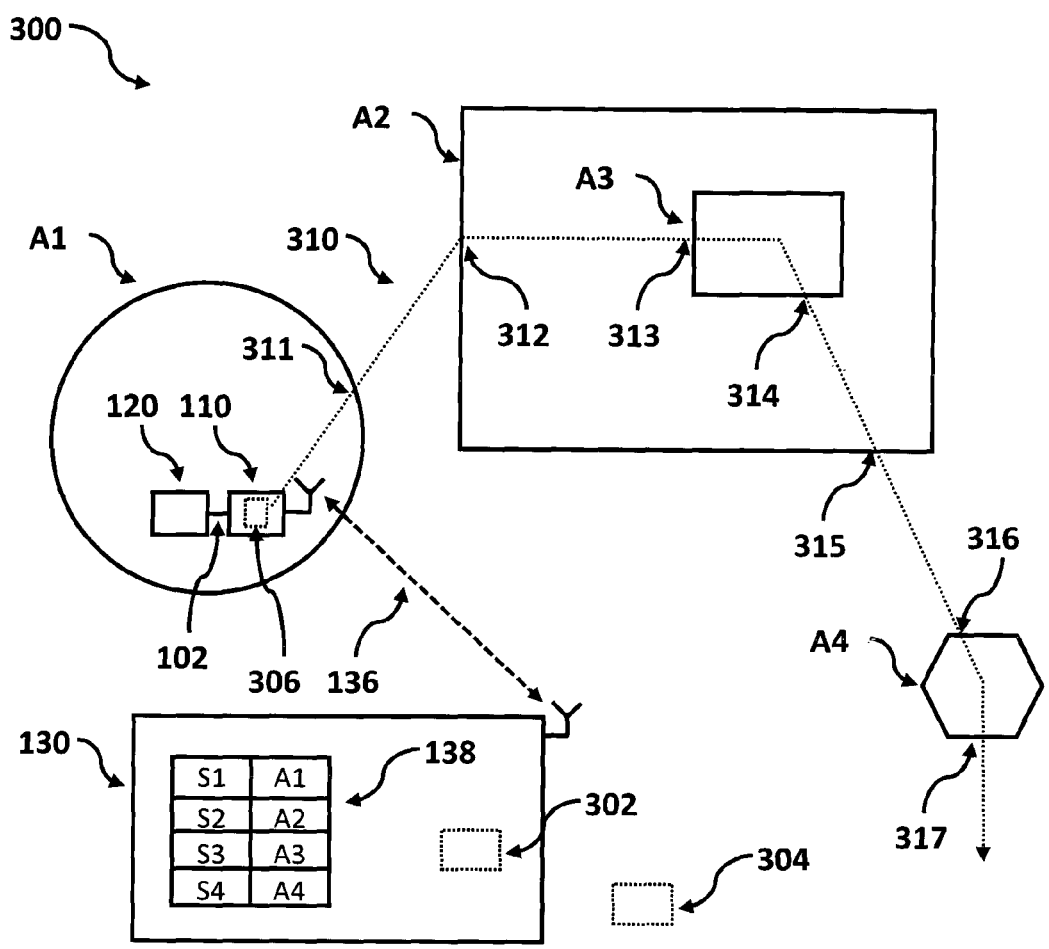
FIG. 3 is a schematic diagram of a geographical region in which a first apparatus is provided with different levels of access to a second device based upon the geographic location of the first apparatus according to an embodiment.

FIG. 3 is a schematic diagram of a geographical region in which a first apparatus is provided with different levels of access to a second device based upon the geographic location of the first apparatus according to an embodiment. Supervisor apparatus 130 includes a database 138 which stores a set of second secret (i.e. supervisor) keys each of which has an associated geographic area of use. In this embodiment database 138 stores four supervisor keys S1, S2, S3 and S4 along with associated areas A1 A2 A3 A4, which define the area within which the associated supervisory key may be used by the first apparatus 110. These areas will be referred to as approved areas. As described above a supervisory key is sent to the first apparatus which uses the supervisory key with a first secret key to generate a link key for establishing a secure wireless connection 102 with a second apparatus 120. In this case the second apparatus stores the set of four link keys that could be generated from S1, S2, S3 and S4, along with an associated access level to control what functions/resources the first apparatus can access in the second apparatus when using the associated link key. Association of a supervisory key with an approved area, or association of a link key with an access level may be via a shared index in database table, via linked lists, or other data structures or pointers, A wireless communications link 136 such as a data link in a mobile telephone network is established (and maintained) between the supervisor apparatus 130 and the first apparatus 110. The supervisor apparatus receives location estimates of the first apparatus. These could be provided by a location estimator 306, such as a GPS receiver included in or operatively connected to the first apparatus 110, or the supervisor apparatus could receive a location estimate from another entity. For example if the first apparatus is mobile phone, the supervisor apparatus could request a location estimate from a location service module 304 in a mobile phone network which uses network data to estimate the position of the mobile telephone. The location estimate may be an area associated with a cell or cell sector that the first apparatus is within, or the location service module could attempt to triangulate the location of the first apparatus based upon communications between the first apparatus and network infrastructure (e.g. which base stations can see the mobile terminal). Referring back to FIG. 3, the first apparatus provides a first location estimate which is within area A1. Accordingly supervisor apparatus provides supervisory key S1 to the first apparatus, which uses this to generate a first link key that is used to establish a secure wireless communications link 102 with a second apparatus 120, and gains a first level of access to the second apparatus. The user of the first and second apparatus then proceeds to travel along path 310, and at point 311 moves out of the area A1. As the apparatus 110 is no longer within approved area A1, supervisor key S1 is no longer valid, and thus the access level (or rights) granted to the second apparatus needs to be revoked, There are several mechanisms that can be used to monitor the location and initiate revocation of the current access level. In one embodiment, the supervisor apparatus is monitoring the location of the first apparatus. This may be a continuous or periodic basis such as by the obtaining a position estimate at regular time intervals, or where the gap between successive positions estimates is no longer than some time interval. The position estimate may be obtained directly from the first apparatus (e.g. using a GPS receiver in the apparatus) over wireless link 136, or the position estimate may be provided by a location service in a mobile network. Suitable timer intervals may be every 10 seconds, 30 seconds, 1 minute, 5 minutes or every 10 minutes. The supervisor apparatus could check each received position estimate to determine if the first apparatus is within the approved area A1. Once it is determined that the first apparatus is no longer within the approved area, the supervisor apparatus can send a command to first apparatus to tear down a secure connection to the second device established with the first supervisor key S1 associated with approved area A1. In another embodiment, the approved area A1, is sent to the first apparatus along with the associated supervisor key S1, and the first apparatus is configured to check whether the apparatus is within the approved area. When the first apparatus determines it is no longer within the approved area A1, then the first apparatus is configured to tear down the secure wireless connection with the second apparatus. In another embodiment, the first apparatus could provide a location estimate and the approved area A1 to the second apparatus, which monitors the location of the first apparatus and is configured to tear down the secure wireless connection to the first apparatus once it is determined the first apparatus is no longer within approved area A1.

When the first apparatus leaves an approved area, and tears down the secure connection to the second apparatus, the first apparatus can establish a new secure connection to the second apparatus, using a different link key based upon the new location of the first apparatus. For example in FIG. 3, as the first apparatus 110 moves over the boundary of A1 by passing through point 313, the first apparatus is no longer within any of the approved areas A1 to A4, and thus the supervisor apparatus will not send the apparatus a supervisor key. In this case the first apparatus will establish a secure wireless connection with the second apparatus using only the first secret key, and thus only receive a low access level. However as the first apparatus proceeds along path 310 he will move into approved area A2 at point 312. Once he is within area A2, the supervisor apparatus will send the supervisory key S2 over wireless link 136 and the first apparatus can tear down the previous secure connection with the second apparatus, and establish a new secure connection using a link key generated from supervisor key S2, and thus be granted the access level associated with approved area A2 by the second apparatus. As the first apparatus passes along path 310 the apparatus enters approved area A3 at point 313. The approved area A3, whilst being wholly contained within A2, has a different access level to the access level associated with approved area A2. Thus as the first apparatus enters A3 at point 313, it will be determined by either the first apparatus, the second apparatus or the supervisory apparatus, that the first apparatus is within approved area A3, and the supervisory apparatus 130 will send the supervisory key S3 to the first apparatus. The secure connection 102 between the first and second apparatus can be torn down, and re-established with the new link key, and the first apparatus can then be granted access to the second apparatus based upon the access level associated with area A3. Of course once the first apparatus moves along path 310 and then leaves approved area A3 and re-enters approved area A2, the secure link 102 is torn down and re-established and the access level reverts back to the access level associated with area A2.

This process of tearing down and re-establishing secure link 102, and then changing the access level for the first apparatus continues as the first apparatus moves along path 310. For example as the first apparatus moves out of approved area A2 at point 315 the access level is reverted back to the basic level of access based purely on the first secret key. Then as the first apparatus enters area A4 at point 316 the supervisor apparatus sends supervisory key S4 to the first apparatus enabling the first apparatus to gain the access level associated with area A4. Finally as the first apparatus leaves area A4 at point 317 the access level reverts back to the basic level of access based purely on the first secret key.

In one embodiment, rather than have the first apparatus and second apparatus tear down the secure communications link 102 as they cross the boundary of the approved area, and re-establish a new secure communications link, the first apparatus can instead maintain the existing secure communications link 102 whilst providing a new link key over the secure communications link. When the apparatus determines it is no longer within the approved area for the current link key, or when the apparatus receives a command to tear down the link from the supervisor apparatus or instead receives a new supervisory key (and optionally the approved area for use of that key) the first apparatus can be configured to generate a new link key based upon the first secret key, and a supervisory key if provided by the supervisory apparatus (i.e. if the first apparatus is entering or still within an approved area). The new link key can be sent over the secure connection 102, and the second apparatus can check this new link key against its database of link keys associated with the first apparatus. If this new link key is known then the current access level can be changed to the new access level associated with the new link key. This embodiment reduces latency associated with tearing down and re-establishing a new secure communication links by maintaining the original secure communications link between the first apparatus and the second apparatus, and instead sending only the updated configuration information (i.e. the new link key). In one embodiment the configuration of the secure communications link is not changed, but instead the new link key is only used to establish the new access level. In another embodiment, the secure communications link is reconfigured to utilise the new link key. For example any link related parameters, such as those used for encryption are recalculated using the new link key, and at an agreed time or trigger point, the parameters are updated in each apparatus so that the link will use the new parameters. This reconfiguration approach may also reduce latency compared to formally tearing down and re-establishing a secure communications link.

From FIG. 3 it can be seen that approved areas can have a variety of geographic shapes. Whilst not shown in FIG. 3, an approved area can have an irregular shape or boundary, and approved areas can be partially or fully embedded in other approved areas (for example A3 is fully contained within A2). This allows a supervisor apparatus to provide granular control over what a user may do in specific areas. In other embodiments, there may be several supervisory apparatus. For example in one embodiment a centralised management server could be used to provide supervisory keys for a first set of areas (e.g. A1, A2, and A4 in FIG. 3), and one or more supervisory apparatus which provide proximity based keys for other areas (e.g. to define area A3 in area A2). These additional supervisory apparatus provide proximity based supervisory keys and thus could be used in places where mobile phone reception is poor, or for highly secure sites where physical proximity is preferable.

Other variations and embodiments are possible. For example the supervisory apparatus can thus act as a centralised management server that stores a plurality of second secret keys for a plurality of apparatuses, and each of the second secret keys can have an associated area stored with the secret key. Additionally a key may have a time limit or expiry time, after which it may not be used or the secure link 102 may need to be torn down, or the first apparatus may be required to contact the supervisory apparatus which can issue approval or a new expiry time to allow continued use of the link Equivalent information can be stored in the second apparatus to support these controls (e.g. time periods, areas of use, etc.). In one embodiment, the supervisory apparatus may send a set of link keys (e.g. S1 to S4) and the set of associated areas (e.g. A1 to A4) when a secure communications link 102 is first established, and the first apparatus can be configured to regenerate link keys based on position estimates and provide these to the second apparatus to allow control of the access level.

The methods, apparatuses and systems described herein advantageously provide secure access control systems and methods for establishing a secure connection between two apparatuses, and in one embodiment, Bluetooth enabled apparatuses, and controlling access to the second apparatus based upon the link key used to establish the secure connection. Granular control of access can be provided through the use of multiple link keys each of which provides a different level of access. Further each link key can be limited to use with a limited geographic area, for example a proximity region around a supervisor apparatus, or a link key may be associated with an approved area and position estimates used to determine which link key to use, and thus what level of access the first apparatus will be granted.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for securely controlling access in an apparatus, the method comprising:
    storing a partial link key in a first apparatus;
    receiving, by the first apparatus, a first secret key from a first source;
    generating a link key for establishing a secure wireless connection with a second apparatus,
   wherein if the first apparatus receives a second secret key from a second source then the link key has a first link key value generated using the stored partial link key, the first secret key and the second secret key, else if no second secret key is received from a second source then the link key has a second link key value generated using the stored partial link key and the first secret key;

storing the generated link in the first apparatus;
establishing a secure wireless connection between the first apparatus and the second apparatus using the link key;
granting, to the first apparatus by the second apparatus, a first level of access to the second apparatus if the link key has the first link key value, and granting a second level of access if the link key has the second link key value, the second level of access having less access than the first level of access; and
wirelessly transmitting the second secret key from the second source to the first apparatus using a near field or short range wireless communications protocol if the first apparatus is within a first communication range of the second source;
wherein the first level of access is granted only whilst the first apparatus remains within the first communication range of the second source; and
wherein when the first apparatus is no longer within the first communication range of the second source, the secure wireless connection between the first apparatus and the second apparatus using the first link key value is torn down and a new secure wireless connection is established using the second link key value.

2. The method as claimed in claim 1, wherein the first source is a user of the first and second apparatuses, and the second source is a supervisor apparatus.

3. The method as claimed in claim 2, wherein the supervisor apparatus is an apparatus under the control of the supervisor of the user, and receives the second secret key from the supervisor.

4. The method as claimed in claim 2 wherein the supervisor apparatus is a portable apparatus.

5. The method as claimed in claim 2 wherein the supervisor apparatus is in a fixed location.

6. The method as claimed in claim 1, wherein the second secret key is transmitted over a secure wireless link.

7. The method as claimed in claim 2, wherein the first secret key is entered into the first apparatus by the user and the second secret key is not entered into the first apparatus by the user.

8. The method as claimed in claim 1, further comprising the step of sending a location estimate of the first apparatus to the second source over a wireless communication link between the first apparatus and the second source, and the second source sends the second secret key if the estimated location of the first apparatus is within an approved area.

9. The method as claimed in claim 8, wherein the second apparatus stores a plurality of link keys, and each link key grants a different level of access to the second apparatus, and the second source stores a plurality of approved areas and a plurality of second secret keys, and each of the plurality of second secret keys is used to generate a different level of access to the second apparatus and is associated with at least one of the approved areas, and after receiving a location estimate of the first apparatus, the second apparatus determines if the first apparatus is within one of the plurality of approved areas, and if the first apparatus is determined to be within one of the plurality of approved areas the second source sends the second secret key associated with the approved area that the first apparatus is determined to be within.

10. The method as claimed in claim 8, wherein when the first apparatus is no longer within an approved area, the first level of access to the second apparatus is revoked.

11. The method as claimed in claim 10, wherein when the first apparatus is no longer within an approved area, the secure wireless connection between the first apparatus and the second apparatus established using the first link key is torn down.

12. The method as claimed in claim 10, wherein the secure wireless connection between the first apparatus and the second apparatus established using the first link key is only maintained whilst a wireless connection is maintained between the first apparatus and the second source, and the second source monitors the location of the first apparatus, and sends a command to the first apparatus to tear down the secure wireless connection between the first apparatus and the second apparatus established using the first link key when the first apparatus is no longer within the approved area associated with the second secret key used to generate the first link key.

13. The method as claimed in claim 8, wherein the second source is a centralised management server that stores a plurality of second secret keys for a plurality of apparatuses.

14. The method as claimed in claim 1, wherein the first and second apparatuses are Bluetooth enabled apparatus, and the secure wireless connection is a secure Bluetooth connection.

15. An apparatus, comprising:
a memory, the memory comprising a first partial link key;
a user input apparatus for receiving a first secret key from a first source;
a first communications device for receiving a second secret key from a second source; and
a link key generator for generating a first link key based upon the stored first partial link key, the first secret key and the second secret key or a second link key based upon the stored first partial link key and the first secret key;
a secure wireless communications device for establishing a secure wireless connection with a second apparatus using either the first link key or the second link key, wherein in use, if the first link key is used to establish the wireless connection with the second apparatus, the apparatus is granted a first level of access to the second apparatus, and if the second link key is used to establish the wireless connection with the second apparatus, the apparatus is granted a second level of access to the second apparatus, the second level of access having less access than the first level of access; and
the first communications device receives the second secret key over a near field or short range wireless communications link from the second source when the apparatus is within a first communication range of the second source;
wherein the first level of access is granted only whilst the apparatus remains within the first communication range of the second source; and
wherein when the apparatus is no longer within the first communication range of the second source, the apparatus is configured to tear down the secure wireless connection established using the first link key, and the apparatus is configured to establish a new secure wireless connection using the second link key.

16. The apparatus as claimed in claim 15, wherein the user input apparatus is a keypad.

17. The apparatus as claimed in claim 15, wherein the first communications device receives the second secret key over a wired communications link.

18. The apparatus as claimed in claim 15, wherein the second source is a supervisor apparatus.

19. The apparatus as claimed in claim 18, wherein the first communications device receives the second secret key over a secure wireless communications link.

20. The apparatus as claimed in claim 15, wherein the first communications device is a wireless communications device configured for communicating over a mobile phone or long range radio communications protocol with the second source.

21. The apparatus as claimed in claim 20, wherein the apparatus further comprises a location estimator, and wherein the apparatus is configured to send a location estimate of the apparatus to the second source over a wireless communication link between the apparatus and the second source.

22. The apparatus as claimed in claim 21, wherein the apparatus further receives an approved area with the second secret key, and the apparatus is configured to tear down a secure wireless connection between the apparatus and the second apparatus established using the first link key when the location estimate of the apparatus is no longer within the approved area.

23. The apparatus as claimed in claim 21, wherein a secure wireless connection established between the apparatus and the second apparatus established using the first link key is only maintained whilst a wireless connection is maintained between the apparatus and the second source, and the apparatus is configured to tear down the secure wireless connection in response to a command from the second source received over the wireless connection.

24. The apparatus as claimed in claim 15, wherein the first communications device comprises the secure wireless communications device.

25. The apparatus as claimed in claim 15, wherein the secure wireless communications device is a Bluetooth enabled communications device and the secure wireless connection is a secure Bluetooth connection.

26. An apparatus, comprising:
a memory, the memory comprising at least a first link key and a second link key;
a wireless communications device for establishing a secure wireless connection with a second apparatus using either the first link key or the second link key; and
an access controller for granting access to the one or more functions or resources of the apparatus to the second apparatus, wherein the access controller grants a first level of access to the second apparatus if the secure wireless connection was established with first link key value, and grants a second level of access if the secure wireless connection was established with second link key value, the second level of access having less access than the first level of access, wherein in use, the first link key value is generated in the second apparatus based upon a stored partial link key, a first secret key received from a first source and a second secret key received from a second source, and the second link key value is generated using the stored partial link key and the first secret key received from the first source;
wherein the second secret key is received over a near field or short range wireless communications link from the second source when the apparatus is within a first communication range of the second source;
wherein the first level of access is granted only whilst the apparatus remains within the first communication range of the second source; and
wherein when the apparatus is no longer within the first communication range of the second source, the apparatus is configured to tear down the secure wireless connection established using the first link key value, and the apparatus is configured to establish a new secure wireless connection using the second link key value.

27. The apparatus as claimed in claim 26, wherein the apparatus is a weapon, and the one or more functions or resources comprise firing the weapon.

28. The apparatus as claimed in claim 26, wherein the wireless communications device is a Bluetooth enabled communications device, and the secure wireless connection is a secure Bluetooth connection.

29. A supervisor apparatus, comprising:
a memory, the memory for storing a secret key; and
a communications device for establishing a communication link with a first apparatus, and providing the secret key to the first apparatus for use in generating a link key for generating a secure wireless connection with a second apparatus, wherein in use, the first apparatus generates the link key using a stored partial link key, a first secret key from a first source and the secret key provided by the supervisor apparatus, and the first apparatus is granted a first level of access to the second apparatus if the generated link key is used to establish the secure wireless connection between the first apparatus and the second apparatus, and if the first apparatus generates the link key using the stored partial link key and the first secret key, the first apparatus is granted a second level of access to the second apparatus, the second level of access having less access than the first level of access;
wherein the communications device provides the secret key over a near field or short range wireless communications link to the first apparatus when the first apparatus is within a first communication range of the supervisor apparatus;
wherein the first level of access is granted only whilst the first apparatus remains within the first communication range of the supervisor apparatus; and
wherein when the first apparatus is no longer within the first communication range of the supervisor apparatus, the first apparatus is configured to tear down the secure wireless connection established using the link key generated using the stored partial link key, the first secret key from the first source and the secret key provided by the supervisor apparatus, and the first apparatus is configured to establish a new secure wireless connection using the link key generated using the stored partial link key and the first secret key.

30. The supervisor apparatus as claimed in claim 29, further comprising:
a user input apparatus for receiving the secret key from a user.

31. The supervisor apparatus as claimed in claim 29, wherein the apparatus is a portable apparatus.

32. The supervisor apparatus as claimed in claim 29, wherein the apparatus is mounted in a fixed location.

33. The supervisor apparatus as claimed in claim 29, wherein the communications device provides the secret key to the first apparatus over a wired connection.

34. The supervisor apparatus as claimed in claim 29, wherein the communications device provides the secret key to the first apparatus over a secure wireless connection.

35. The supervisor apparatus as claimed in claim 29, wherein the memory stores an approved area for use of the secret key, and further comprising a location verification device that is configured to receive a location estimate of the first apparatus and the secret key is only sent to the first apparatus if the location estimate of the first apparatus is within the approved area.

36. The supervisor apparatus as claimed in claim 35, wherein the location estimate is a location estimate received from the first apparatus via the communications device.

37. The supervisor apparatus as claimed in claim 35, wherein the memory stores a plurality of approved areas and a plurality of second secret keys, and each of the plurality of second secret keys is associated with at least one of the approved areas, and the location verification device is configured such that after receiving a location estimate of the first apparatus, the supervisor apparatus determines if the first apparatus is within one of the plurality of approved areas, and if the first apparatus is determined to be within one of the plurality of approved areas the secret key associated with the approved area that the first apparatus is determined to be within is sent to the first apparatus.

38. The supervisor apparatus as claimed in claim 37, wherein the supervisor apparatus sends the approved area to the first apparatus with the secret key.

39. The supervisor apparatus as claimed in claim 37, wherein location verification device is configured to monitor the location of the first apparatus after a secret key is send to the first apparatus, and if the first apparatus is detected leaving the approved area for use of the secret key, a command is sent to the first apparatus to tear down a secure wireless connection established using a first link generated using the secret key.

40. The supervisor apparatus as claimed in claim 35, wherein the supervisor apparatus is a centralised management server that stores a plurality of secret keys for a plurality of apparatus.

41. The supervisor apparatus as claimed in claim 29, wherein the secret keys is used to establish a secure Bluetooth connection.

* * * * *